(12) United States Patent
Nocera

(10) Patent No.: US 9,167,316 B2
(45) Date of Patent: Oct. 20, 2015

(54) REUSABLE MEDIA SOURCES FOR ONLINE BROADCAST DATA

(75) Inventor: Bastien R. D. Nocera, Guildford (GB)

(73) Assignee: Red Hat, Inc., Raleigh, NC (US)

( * ) Notice: Subject to any disclaimer, the term of this patent is extended or adjusted under 35 U.S.C. 154(b) by 1205 days.

(21) Appl. No.: 12/704,776

(22) Filed: Feb. 12, 2010

(65) Prior Publication Data

US 2011/0202840 A1  Aug. 18, 2011

(51) Int. Cl.
*G06F 3/00* (2006.01)
*H04N 21/81* (2011.01)
*H04N 21/482* (2011.01)

(52) U.S. Cl.
CPC ......... *H04N 21/8193* (2013.01); *H04N 21/482* (2013.01)

(58) Field of Classification Search
CPC ........................... H04N 21/4622; H04N 21/84
USPC ......... 715/716, 717; 709/203; 725/39, 50, 51, 725/110, 112
See application file for complete search history.

(56) References Cited

U.S. PATENT DOCUMENTS

2003/0120758 A1* 6/2003 Yassin et al. ................... 709/221
2004/0123109 A1* 6/2004 Choi ............................. 713/176
2004/0220926 A1* 11/2004 Lamkin et al. .................... 707/3
2006/0218180 A1* 9/2006 Bodlaender et al. ...... 707/103 R
2009/0089847 A1* 4/2009 Jacobs et al. .................. 725/106

OTHER PUBLICATIONS

James Henstridge, "Watching iView with Rygel", Jul. 2009, "James Henstridge.pdf", 3 pages.*
"GNOME Live!", http://live.gnome.org/Rygel/MediaServerSpec, printed from Internet on Feb. 16, 2010, (Nov. 17, 2009), 6 pages.
"Introduction to DBus", http://www.freedesktop.org/wiki/IntroductionToDBus, printed from Internet on Feb. 16, 2010, (Apr. 22, 2009), 7 pages.

* cited by examiner

*Primary Examiner* — Haoshian Shih
(74) *Attorney, Agent, or Firm* — Lowenstein Sandler LLP

(57) ABSTRACT

A broadcaster-specific service module is provided for applications hosted by a processing device. The broadcaster-specific service module and the applications communicate through a common service bus. The broadcaster-specific service module receives items from an online broadcaster via a network, with each item associated with a media file or stream available from the online broadcaster. The broadcaster-specific service module generates a catalog containing a tree of the items, and sends the catalog to a target application via the service bus to display the catalog for user selection. The broadcaster-specific service module formats data of the catalog can be understood by all of the applications attached to the service bus.

14 Claims, 4 Drawing Sheets

REUSABLE MEDIA SOURCES FOR ONLINE BROADCAST DATA

TECHNICAL FIELD

Embodiments of the present invention relate to media data processing, and more specifically, to the generation of a catalog for online digital media using a reusable service.

BACKGROUND

A media player is an application or a device for playing back multimedia files. Generally, a media player supports one or more specific media types, such as audios, videos and images. Examples of a media player include a music player, a movie player, a photo management system, etc.

A media player can be used to stream or play back media data from an online broadcaster. Examples of an online broadcaster include the British Broadcasting Corporation (BBC), the National Public Radio (NPR), YouTube, Hulu, etc. Broadcasters seldom use industry recognized standards to share their data. A broadcaster typically does not provide a user with a computer-readable listing of programs available for download. Even if a broadcaster provides such a listing, gathering all the contents available from the broadcaster might require aggregating different sources.

Conventionally, a plugin is necessary for a media player to obtain downloadable information from a broadcaster. The plugin is specific to a particular media player and a particular broadcaster. That is, the plugin cannot be shared among different media players.

For example, to support an online broadcaster's radio and television (TV) offerings with four multimedia applications, it would be necessary to add four different plugins. A first plugin adds support for the broadcaster's radio programs to a music player. A second plugin adds support for the broadcaster's TV programs to a movie player. A third plugin adds support for the broadcaster's radio and TV programs to a media center application. A fourth plugin adds support for the broadcaster's radio and TV programs to an application that makes the radio and TV programs available on a network (e.g., Universal Plug and Play (UPnP) exports to a game console, such as the Xbox, a product of the Microsoft Corporation, or the Playstation 3, a product of the SONY Corporation). These four plugins cannot be reused across different applications even though the plugins deal with the same media source. The use of a different plugin for each media application greatly increases the complexity for managing media data.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
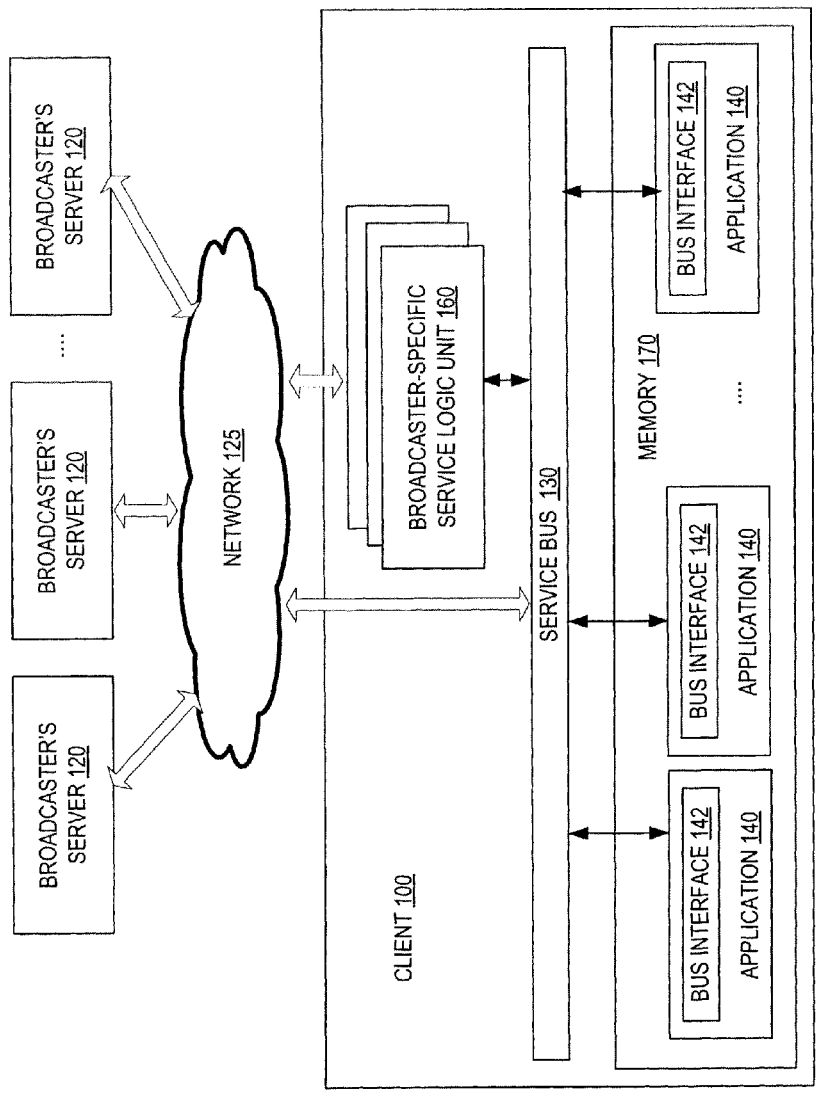
FIG. 1 illustrates a network architecture in which embodiments of the present invention may be implemented.

Described herein is a method and system for reusing media sources for online broadcast data. In one embodiment, a broadcaster-specific service module is provided for applications (also referred to as "front-end applications") hosted by a processing device. The broadcaster-specific service module and the applications communicate through a common service bus. The broadcaster-specific service module receives items from an online broadcaster via a network, with each item associated with a media file or stream available from the online broadcaster. The broadcaster-specific service module generates a catalog containing a tree of the items, and sends the catalog to a target application via the service bus to display the catalog for user selection. The broadcaster-specific service module formats data of the catalog can be understood by all of the applications attached to the service bus.

In one embodiment, the broadcaster-specific service module serves as a back-end process to catalog an online broadcaster's media program offerings. The broadcaster-specific service module can be shared or reused by a number of front-end applications. In one embodiment, a different broadcaster-specific service is used to interpret the data made available by a different broadcaster. Thus, a processing device may host a number of different broadcaster-specific services to receive media data from different broadcasters. All of the broadcaster-specific services use an application programming interface (API) to communicate with a common service bus. All of the applications also communicate with the same service bus. Through the service bus, applications can understand (or "read") the data from any of the broadcaster-specific services. Therefore, it is unnecessary to write a broadcaster-and-application-specific plugin for each combination of a broadcaster and an application.

Examples of online broadcast media data that can be accessed through the broadcaster-specific service include, but are not limited to: podcasts offered by online broadcasters (e.g., NPR, BBC, etc.), videos offered by on-demand/catch-up TV services (e.g., Hulu, the BBC iPlayer, etc.), videos offered by video-sharing sites (e.g., YouTube), songs available at an online music store, music shared from other computers, photo albums from photo management sites (e.g., Picasa, Flickr, etc.). As mentioned before, most online broadcasters do not provide a program listing that is readable by media applications. Thus, aback-end service is necessary to interpret the online broadcaster's data and generate a program listing. According to embodiments of the present invention, all of the applications can share the same broadcaster-specific service ("the back-end service") via a common service bus to receive and display the program listing.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 illustrates an exemplary network architecture in which embodiments of the present invention may operate. In one embodiment, the network architecture includes online broadcaster's servers 120 that send broadcast data to a client 100 via a network 125. The client 100 may be a processing device capable of downloading and streaming media data transmitted from the online broadcaster's servers 120. The client 100 may be a computer (e.g., a server, a workstation, a personal computer (PC), a laptop, etc.), a mobile phone, a hand-held computing device, a game station, a personal digital assistant (PDA), etc. The broadcaster may be a news broadcaster, a video or music sharing site, an online radio station, a photo distribution site, etc. The network 125 may be a private network (e.g., a local ea network LAN)), wide area network (WAN), intranet, etc.) or a public network (e.g., the Internet). The network 125 may be wired, wireless, or a combination of both. Note that any number of clients and servers may be implemented.

In one embodiment, the client 100 hosts a number of applications 140 that can stream media data in real time and play back (or display) a media file. The applications 140 handle a variety of different media types. For example, the applications 140 may include a music player, a movie player, a photo management application, a media center application (which provides the functions of both a music player and a movie player), a multimedia application that exports data to a game console, etc. The applications 140 may be stored in a data storage device such as a memory 170. The memory 170 may be volatile memory devices (e.g., random access memory (RAM)), non-volatile memory devices (e.g., flash memory), and/or other types of memory devices.

According to one embodiment of the application, the client 100 includes a broadcaster-specific service logic unit 160 to receive broadcast data from each online broadcaster's server 120 and formats the broadcast data into a catalog that contains a tree of items. An item is an object having a number of properties, such as name, thumbnail location, data location (e.g., a Uniform Resource Locator (URL) that points to the online location of the media stream or file), date added, etc. Each item is associated with, or represents, a media file or stream (e.g., music, a short film, a photo, a podcast, or other type of media data) that is available from the online broadcaster. The broadcaster-specific service logic unit 160 can be shared, or reused by the plurality of applications 140. The broadcaster-specific service logic unit 160 sends the tree of items through the service bus 130 to reach a target application 140. In one embodiment, the tree of items can be displayed by the target application 140 as a catalog (or list). The items in the catalog can be selected by a user, and the media file or streams corresponding to the selected item can be downloaded or streamed from the broadcaster by the target application 140.

In one embodiment, each of the applications 140 contains a bus interface 142 to communicate with a service bus 130. One embodiment of the service bus 130 is D-Bus. D-Bus is a communication protocol for processes or applications running on a local host or remote hosts to communicate with each other. D-Bus carries messages as discrete items instead of continuous data streams. One type of message supported by D-Bus is a one-way message that is broadcast to any connected applications that have registered an interest in the message. In one scenario, an application may register an interest in a particular broadcaster by setting a filter criterion that specifies a set of rules for checking the origin of the messages and determining whether or not the origin matches the particular broadcaster. D-Bus is a form of Inter-Process Communication (IPC). Other forms of IPC can be used for the plugins and providers to communicate.

Figure 2:
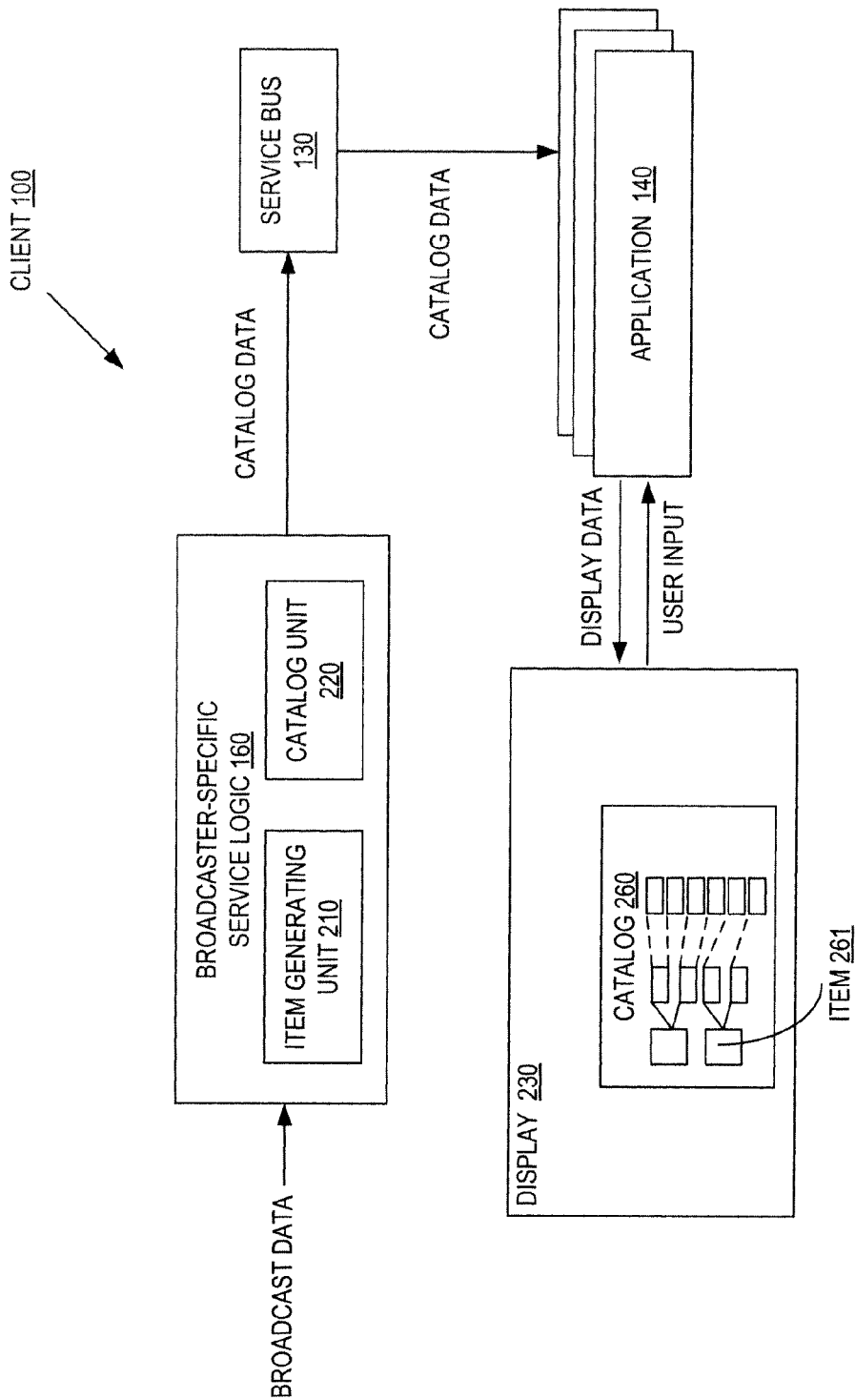
FIG. 2 is a diagram of one embodiment of a processing device that hosts a broadcaster-specific service module.

FIG. 2 illustrates an embodiment of the client 100. In this embodiment, the broadcaster-specific service logic unit 160 includes an item generating unit 210 and a catalog unit 220. Upon receiving the broadcast data from a broadcaster, the item generating unit 210 identifies the location of the media file or stream corresponding to each item and attaches the location to the corresponding item. Most of the time, the broadcaster may use a broadcaster-specific identifier (which is not a URL) for the location of the media file or stream. For example, the broadcaster may use the broadcaster-specific identifier "oMLCrzy9TEs" to uniquely identify the location of a Superbowl video on a broadcaster's site (e.g., "www.My-Broadcaster.com"). Thus, the URL of the video file location is: "www.MyBroadcaster.com/watch?v=oMLCrzy9TEs".

The location information attached to the each item may be the URL or the broadcaster-specific identifier associated with the URL, which can be readily converted into a URL. The item generating unit 210 further generates the items to include other information (e.g., name, thumbnail location, date created, etc.) provided in the broadcast data. The catalog unit 220 formats and organizes the items into a catalog, which contains a tree structure. In a scenario where the broadcasters a news broadcaster, the top level of the tree may include "News," "Editor's Choice" items, etc. Below each top-level item, a number of second-level items may exist. For example, under "News," there may be "Today's Headlines," "World News," "Business," etc. Under "Editor's Choice," there may be "Earthquake in Haiti," "Opinion," etc. Each of the second-level items may be audio, video, or photos, and has a location property (e.g., a URL, or a broadcaster-specific identifier associated with a URL) attached to it. The items at each node of the tree can be organized into a folder. The folders (also referred to as "catalog data") from the top level to the bottom levels are sent to a target application 140 via the service bus 130 upon a request of the target application 140.

In one embodiment, after the target application 140 receives the catalog data, it displays a catalog 260 on a display 230. For the purpose of illustration, the catalog 260 is shown as a tree of items. However, it is understood that the catalog 260 shown on the display 230, as seen by a user, may be organized as sections and subsections and the internal tree structure may be hidden from the user. The user can select an item 261 from the display 230. After the target application 140 receives the item 261 selected by the user, it inspects the properties of the selected item to determine whether the selected item is associated with audio, video, photo, or other media data types. The target application 140 uses the location attached to the selected item to retrieve the corresponding media file or stream from the broadcaster. In one embodiment, the target application 140 may retrieve the corresponding media file or stream directly from the broadcaster without going through the broadcaster-specific service logic unit 160. The target application 140 then streams, plays back or displays the media data retrieved from the broadcaster.

According to embodiments of the present invention, the front-end applications do not have to know how the data is gathered to form a catalog. The back-end (the broadcaster-specific service logic unit 160) takes care of formatting the catalog into a format that can be read by all of the front-end applications. All of the back-end services (for different broadcasters) use the same API to communicate with the front-end applications. Thus, a user can reuse the same back-end service for generating catalogs with any applications that communicate with the service bus 130.

Figure 3:
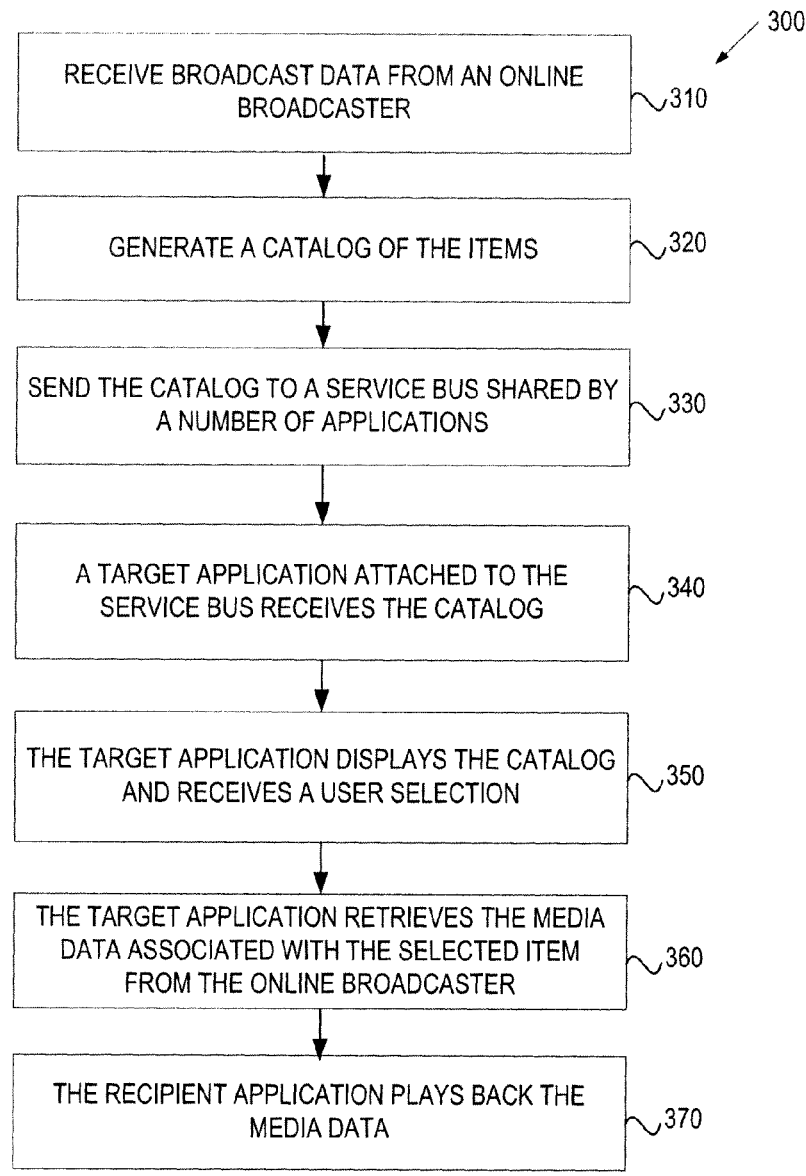
FIG. 3 is a flow diagram illustrating one embodiment of a method for processing online broadcast data using a broadcaster-specific service module.

FIG. 3 is a flow diagram illustrating one embodiment of a method 300 for processing online broadcast data with a broadcaster-specific service. The method 300 may be performed by computer system 400 of FIG. 4 that may comprise hardware (e.g., circuitry, dedicated logic, programmable logic, microcode, etc.), software (e.g., instructions run on a processing device), or a combination thereof. In one embodiment, the method 300 is performed by the processing system 100 of FIG. 1.

Referring to FIG. 3, in one embodiment, the method 300 begins when the broadcaster-specific service logic unit 160 receives broadcast data from an online broadcaster (block 310). In one embodiment, the broadcast data includes a sequence of items containing information regarding songs, short films, videos, photos, podcasts, or other types of media data. The broadcaster-specific service logic unit 160 generates a catalog of the items, which may be organized as a tree and include the online location of the media data associated with each item (block 320). The catalog is sent to the service bus 130 using a pre-determined bus protocol (block 330). In one embodiment, the catalog is sent as messages according to the D-Bus protocol.

At the recipient end of the service bus 130 are the applications 140. A target application attached to the service bus 130 receives the catalog (block 340). The target application displays the catalog and receives a user input indicating a selected item (block 350). The target application retrieves media data associated with the selected item using the online location information attached to the item (block 360). The target application then streams or plays back the retrieved media data (block 370).

Figure 4:
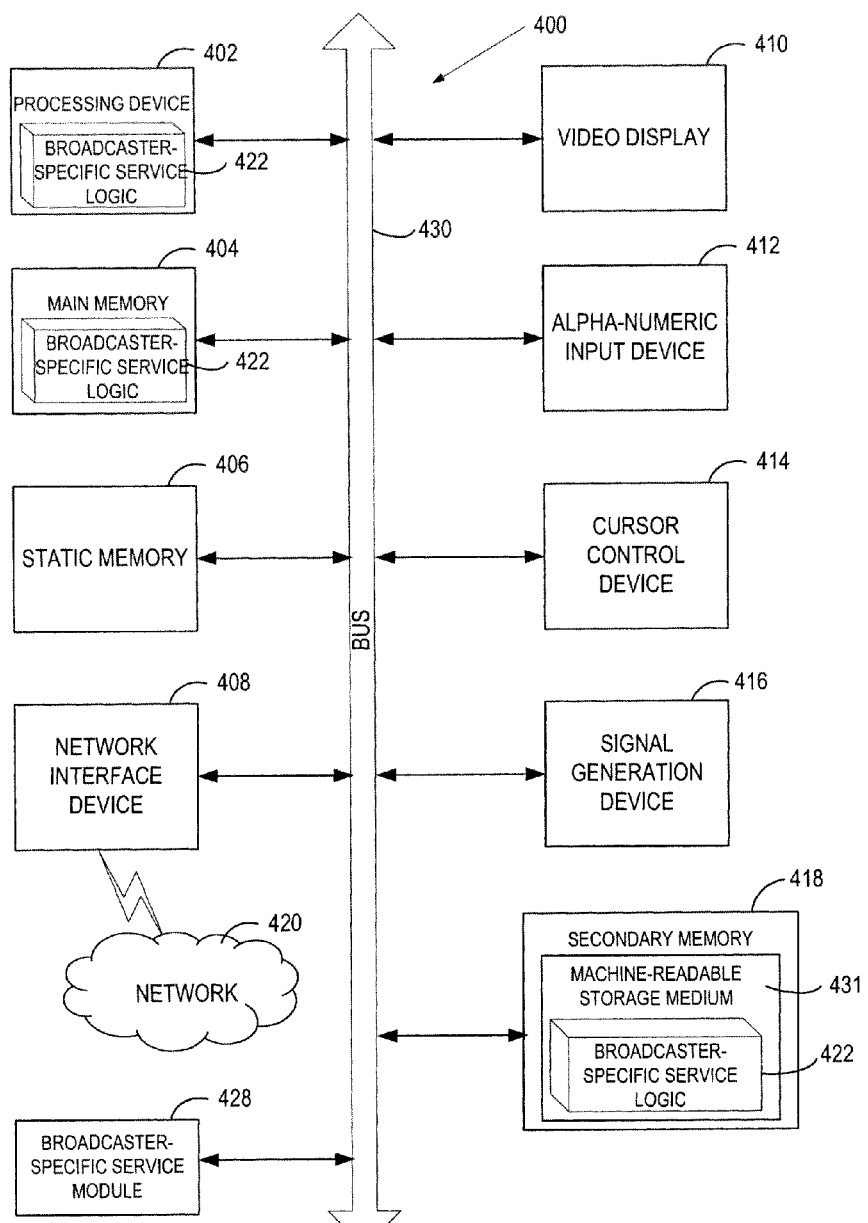
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute broadcaster-specific service logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., broadcaster-specific service logic 422) embodying any one or more of the methodologies or functions described herein (e.g., the broadcaster-specific service logic unit 160 of FIG. 1). The broadcaster-specific service logic 422 may also reside, completely or at least partially, within the main memory 404 and/or within the processing device 402 during execution thereof by the computer system 400; the main memory 404 and the processing device 402 also constituting machine-readable storage media. The broadcaster-specific service logic 422 may further be transmitted or received over a network 420 via the network interface device 408.

The machine-readable storage medium 431 may also be used to store the broadcaster-specific service logic 422 persistently. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

The computer system 400 may additionally include a broadcaster-specific service module 428 for implementing the functionalities of the broadcaster-specific service logic unit 160 of FIG. 1. The module 428, components and other features described herein (for example in relation to FIG. 1) can be implemented as discrete hardware components or integrated in the functionality of hardware components such as ASICS, FPGAs, DSPs or similar devices. In addition, the module 428 can be implemented as firmware or functional circuitry within hardware devices. Further, the module 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "formatting", "generating", "sending", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
    receiving, by a processing device, broadcast data comprising a plurality of items from an online broadcaster via a network, each item associated with a media file or stream available from the online broadcaster, the processing device hosting a plurality of applications employing broadcaster-specific services that communicate with the processing device using a service bus employing a D-bus protocol of discrete messages, each of the plurality of applications employing broadcaster-specific services using a common API associated with the D-bus protocol of discrete messages to communicate with the service bus;
    generating, by the processing device, a catalog containing a tree of the items understandable to each of a corresponding plurality of target applications attached to the service bus, each of the plurality of target applications using the common API to communicate with the service bus;
    formatting, by the processing device, the catalog containing the tree of the items into a format that can be read and understood by each of the corresponding plurality of target applications attached to the service bus in view of the common API; and
    transmitting the catalog, using the processing device, to one of the target applications from one of the applications employing broadcaster-specific services via the service bus.

2. The method of claim 1, wherein the plurality of applications employing broadcaster-specific services stream or play back media data of different media types that comprise music, movies, multimedia or photos.

3. The method of claim 1, wherein the catalog comprises locations of media files or streams associated with the items in the broadcast data.

4. The method of claim 1, further comprising:
    displaying the catalog on a display;
    receiving a selection of one of the items; and
    retrieving the media file or stream from the online broadcaster in view of location information attached to the one of the items.

5. The method of claim 1, wherein the each of the target applications sets a filter criterion that specifies a set of rules for receiving messages from the service bus.

6. The method of claim 1, wherein the applications employing broadcaster-specific services comprises one or more of the following: a media center application, a music player, a movie player, an application that exports broadcast data to a games console, or a photo management application.

7. A system comprising:
    a data storage; and
    a processing device to:
        host a plurality of applications employing broadcaster-specific services employing a D-bus protocol of discrete messages, each of the plurality of broadcaster-specific applications using a common API associated with the D-bus protocol of discrete messages to communicate with a service bus;
        receive broadcast data comprising a plurality of items from an online broadcaster via a network, each item associated with a media file or stream available from the online broadcaster;
        store a broadcaster-specific service module; generate a catalog that contains a tree of the items understandable to each of a corresponding plurality of target applications attached to the service bus, each of the plurality of target applications using the common API to communicate with the service bus;
        format the catalog containing the tree of the items into a format that can be read and understood by each of the corresponding plurality of target applications attached to the service bus in view of the common API; and
        transmit the catalog to one of the target applications from one of the applications employing the broadcaster-specific services via the service bus.

8. The system of claim 7, wherein the plurality of applications employing broadcaster-specific services stream or play back media data of different media types that comprise music, movies, multimedia or photos.

9. The system of claim 7, wherein the catalog comprises locations of media files or streams associated with the items in the broadcast data.

10. A computer readable storage medium comprising instructions to cause a processing device to:
    receive, by the processing device, broadcast data comprising a plurality of items from an online broadcaster via a network, each item associated with a media file or stream available from the online broadcaster, the processing device hosting a plurality of applications employing broadcaster-specific services that communicate with the processing device using a service bus employing a D-bus protocol of discrete messages each of the plurality of applications employing broadcaster-specific services using a common API associated with the D-bus protocol of discrete messages to communicate with the service bus;

generate, by the processing device, a catalog containing a tree of the items understandable to each of a corresponding plurality of target applications attached to the service bus, each of the plurality of target applications using the common API to communicate with the service bus;

format, by the processing device, the catalog containing the tree of the items into a format that can be read and understood by each of the corresponding plurality of target applications attached to the service bus in view of the common API; and transmit, by the processing device, the catalog, to one of the target applications from one of the applications employing the broadcaster-specific services via the service bus.

11. The computer readable storage medium of claim 10, wherein the plurality of applications employing broadcaster-specific services stream or play back media data of different media types that comprise music, movies, multimedia or photos.

12. The computer readable storage medium of claim 10, wherein the catalog comprises locations of media files or streams associated with the items in the broadcast data.

13. The computer readable storage medium of claim 10, wherein the processing device is further to:
display the catalog on a display;
receive a selection of one of the items; and
retrieve the media file or stream from the online broadcaster in view of location information attached to the one of the items.

14. The computer readable storage medium of claim 10, wherein the each of the target applications sets a filter criterion that specifies a set of rules for receiving messages from the service bus.

* * * * *